US012780078B1

(12) United States Patent
Duree

(10) Patent No.: US 12,780,078 B1
(45) Date of Patent: Nov. 3, 2026

(54) RATCHET STRAP STORAGE DEVICE

(71) Applicant: Toby Duree, Phelan, CA (US)

(72) Inventor: Toby Duree, Phelan, CA (US)

( * ) Notice: Subject to any disclaimer, the term of this patent is extended or adjusted under 35 U.S.C. 154(b) by 0 days.

(21) Appl. No.: 19/236,431

(22) Filed: Jun. 12, 2025

(51) Int. Cl.
*B65D 33/24* (2006.01)
*B60P 7/08* (2006.01)
*B65D 33/14* (2006.01)

(52) U.S. Cl.
CPC .............. *B60P 7/083* (2013.01); *B65D 33/14* (2013.01); *B65D 33/24* (2013.01)

(58) Field of Classification Search
CPC .......... B65D 33/24; B65D 33/14; B60P 7/083
USPC .......................................................... 206/338
See application file for complete search history.

(56) References Cited

U.S. PATENT DOCUMENTS 2,084,757 A * 6/1937 Alter ...................... A45C 13/06 383/34
3,327,924 A * 6/1967 Brutting ................. B65D 5/504 493/217
4,662,517 A * 5/1987 Wirth ................... B65H 75/362 206/479
4,688,674 A * 8/1987 Stirtz ................... B65H 75/362 242/588
5,016,792 A * 5/1991 Jay ........................... A45F 4/02 224/155
5,439,109 A * 8/1995 McBride .............. A45C 7/0077 383/111
6,026,962 A 2/2000 Witt
6,789,671 B2 * 9/2004 Morrison ............... A45C 13/30 410/97
6,880,702 B1 * 4/2005 Colorado .................. A45F 3/02 206/388
6,932,550 B1 * 8/2005 Hope ...................... B60P 3/079 410/97
7,165,294 B2 * 1/2007 Surdam ................. B60P 7/0846 24/68 CD
7,681,286 B1 * 3/2010 Lewis ..................... B25B 25/00 254/218
D630,295 S 1/2011 Bechtold, Jr.
8,079,116 B2 12/2011 Ayers
8,641,340 B1 * 2/2014 Steinbock ............ B65D 90/006 410/97
8,789,696 B2 7/2014 Imburgia
9,096,159 B2 8/2015 Wright
9,193,295 B2 11/2015 Breeden
9,908,455 B2 * 3/2018 Phelan, Jr. ............ B60P 7/0853
10,793,052 B1 * 10/2020 Rafuse .................. B60P 7/0846
(Continued)

FOREIGN PATENT DOCUMENTS

CA 2315597 2/2001

*Primary Examiner* — Ernesto A Grano

(57) ABSTRACT

A ratchet strap storage device for storing excess length of a rachet strap includes a ratchet and a ratchet strap extending through the ratchet for tightening the ratchet strap over the cargo on a vehicle. A bag has a first slot and a second slot and extending into an interior of the bag and the ratchet strap is insertable through the first slot and the second slot. The bag has a flap which is positionable in a closed position to close the bag. Excess length of the ratchet strap is stored within the bag to inhibit the excess length from flapping in the wind while the vehicle is transporting the cargo. A first strap is coupled to the bag which can be wrapped around the ratchet strap and the second strap is coupled to the bag which can be threaded through the ratchet.

12 Claims, 10 Drawing Sheets

(56) References Cited

U.S. PATENT DOCUMENTS

| | | | | |
|---|---|---|---|---|
| 10,843,619 | B1 * | 11/2020 | Carter | B60P 7/0853 |
| 11,178,979 | B2 * | 11/2021 | Downs | A47D 13/02 |
| 11,279,421 | B1 * | 3/2022 | Hoogendoorn | B60R 9/06 |
| 12,415,466 | B2 * | 9/2025 | Gordon | B60D 1/187 |
| 12,532,946 | B2 * | 1/2026 | Whitney | A44B 11/125 |
| 2013/0190815 | A1 * | 7/2013 | Mansmann | A61F 2/30756<br>606/232 |
| 2015/0117975 | A1 * | 4/2015 | Wright | B60P 7/0846<br>410/103 |
| 2015/0205327 | A1 * | 7/2015 | Daley, III | G06F 1/1698<br>361/679.03 |
| 2018/0055156 | A1 | 3/2018 | Brady | |

* cited by examiner

RATCHET STRAP STORAGE DEVICE

(1) FIELD OF THE INVENTION

The disclosure relates to ratchet strap devices and more particularly pertains to a new ratchet strap device for storing excess length of a ratchet strap. The device includes a ratchet and the ratchet strap is extended through the ratchet to tighten the ratchet strap over cargo. The device includes a bag which has a first slot and a second slot through which the ratchet strap is extended and excess length of the ratchet strap is wrapped up and stored in the bag. The device includes a flap for closing the bag and a first strap that is coupled to the bag which can be wrapped around the bag to secure the bag to the ratchet strap. The device includes a second strap that is coupled to the bag which can be threaded through the ratchet to secure the bag to the ratchet.

(2) DESCRIPTION OF RELATED ART INCLUDING INFORMATION DISCLOSED UNDER 37 CFR 1.97 AND 1.98

The prior art relates to ratchet strap devices including: a variety of cord storage bag devices that each at least includes a storage bag that has a slot through which a cord can be extended and a closure integrated into the storage bag for closing the storage bag around the cord for storage; a tie down strap system that includes a pouch and a ratchet strap which extends through the pouch which can store excess strap and a tightening mechanism of the ratchet strap within the pouch and a drawstring integrated into the pouch for closing the pouch around the excess strap and the tightening mechanism; a tie down apparatus that includes a ratchet strap and a housing integrated into the ratchet strap for storing the ratchet strap. In no instance does the prior art disclose a ratchet strap storage device that includes a bag that has a first slot and a second slot and a ratchet strap that is extendable through the first slot and the second slot for storing excess strap in the bag and a first strap coupled to the bag for securing the bag to the ratchet strap and a second strap coupled to the bag for securing the bag to the ratchet strap to inhibit the bag and the excess strap from flapping in the wind.

(h) BRIEF SUMMARY OF THE INVENTION

An embodiment of the disclosure meets the needs presented above by generally comprising a ratchet and a ratchet strap extending through the ratchet for tightening the ratchet strap over the cargo on a vehicle. A bag has a first slot and a second slot and extending into an interior of the bag and the ratchet strap is insertable through the first slot and the second slot. The bag has a flap which is positionable in a closed position to close the bag. Excess length of the ratchet strap is stored within the bag to inhibit the excess length from flapping in the wind while the vehicle is transporting the cargo. A first strap is coupled to the bag which can be wrapped around the ratchet strap and the second strap is coupled to the bag which can be threaded through the ratchet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
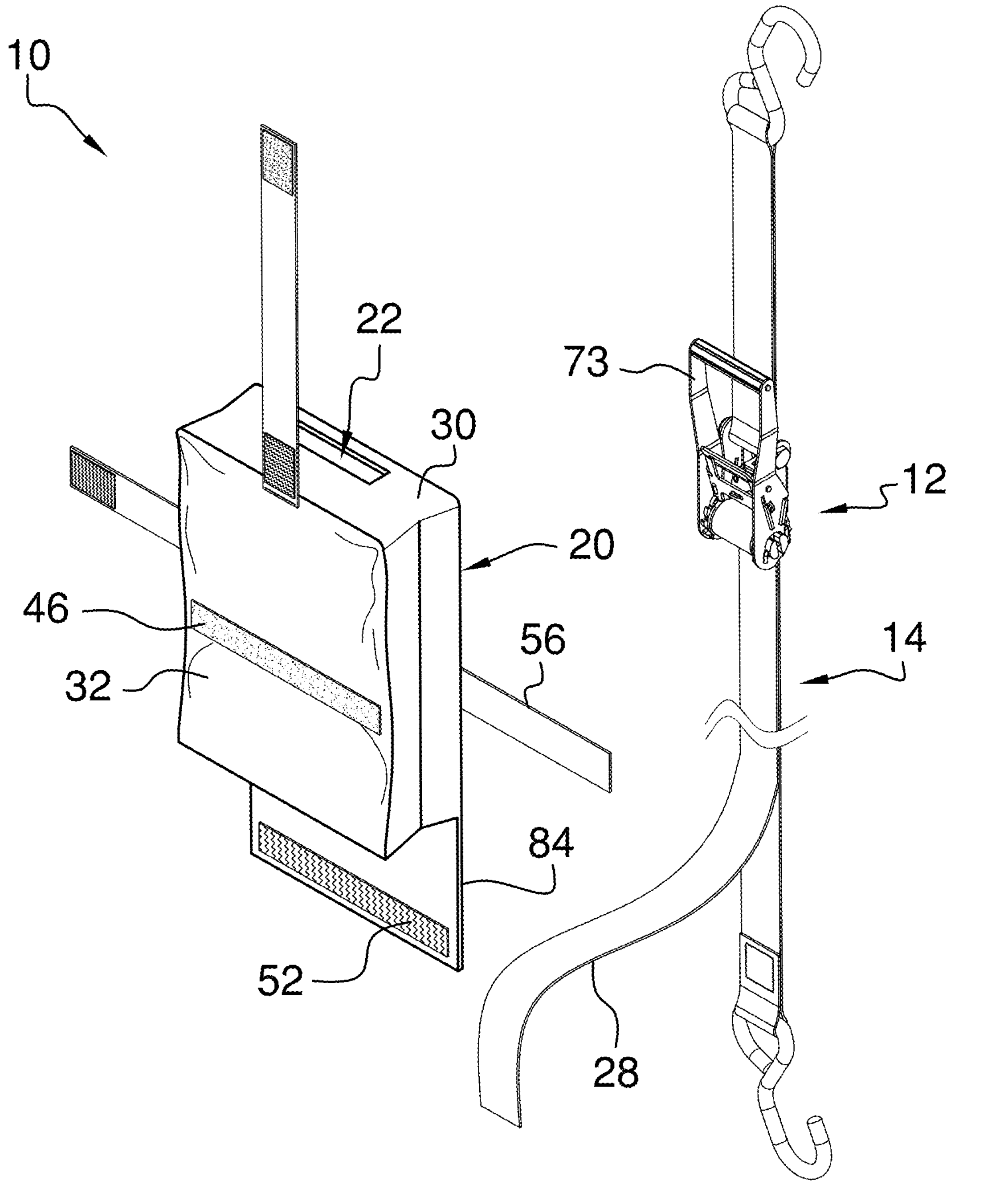
FIG. 1 is a perspective view of a ratchet strap storage device according to an embodiment of the disclosure.
Figure 2:
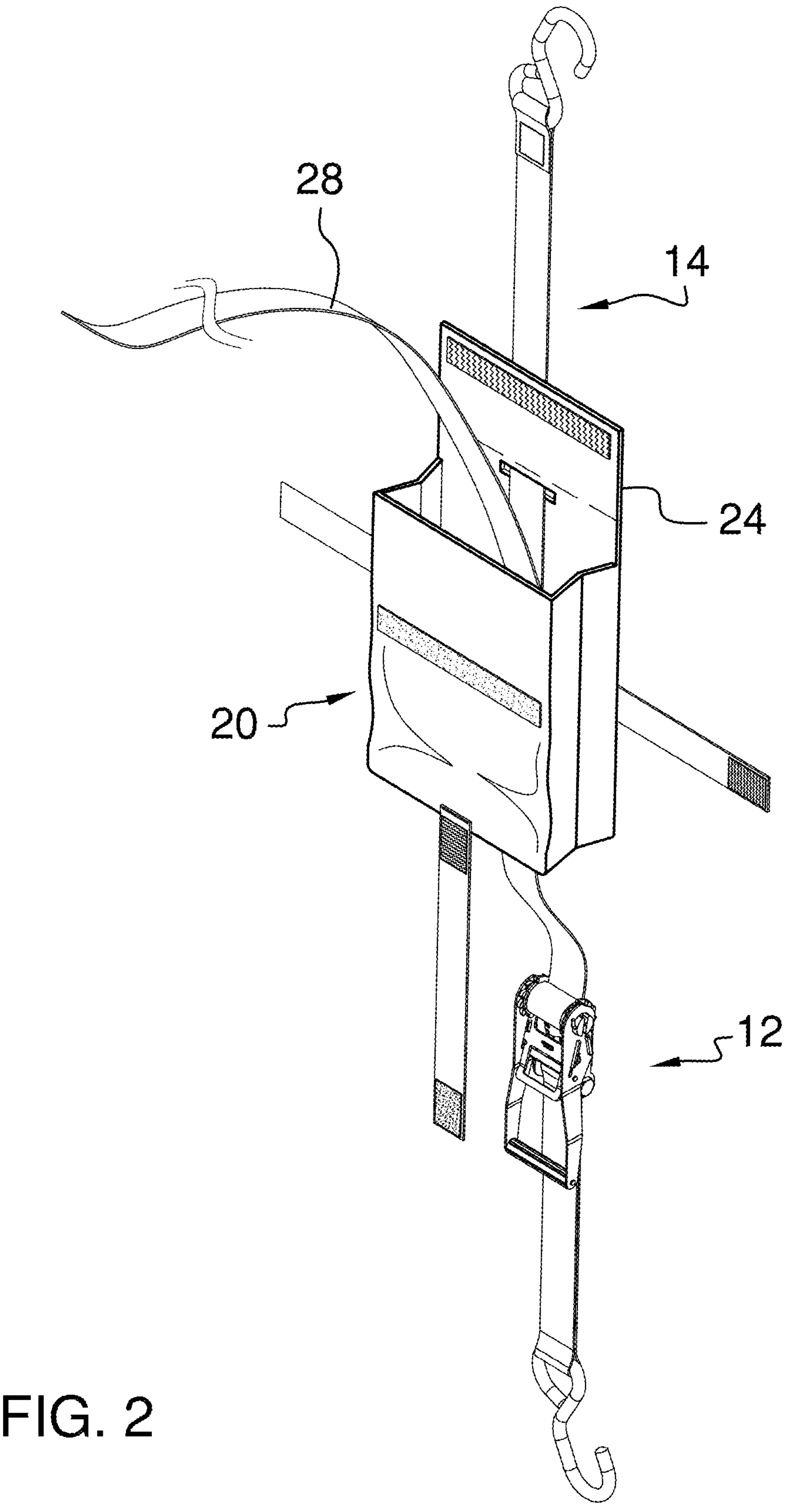
FIG. 2 is a front perspective view of an embodiment of the disclosure.
Figure 3:
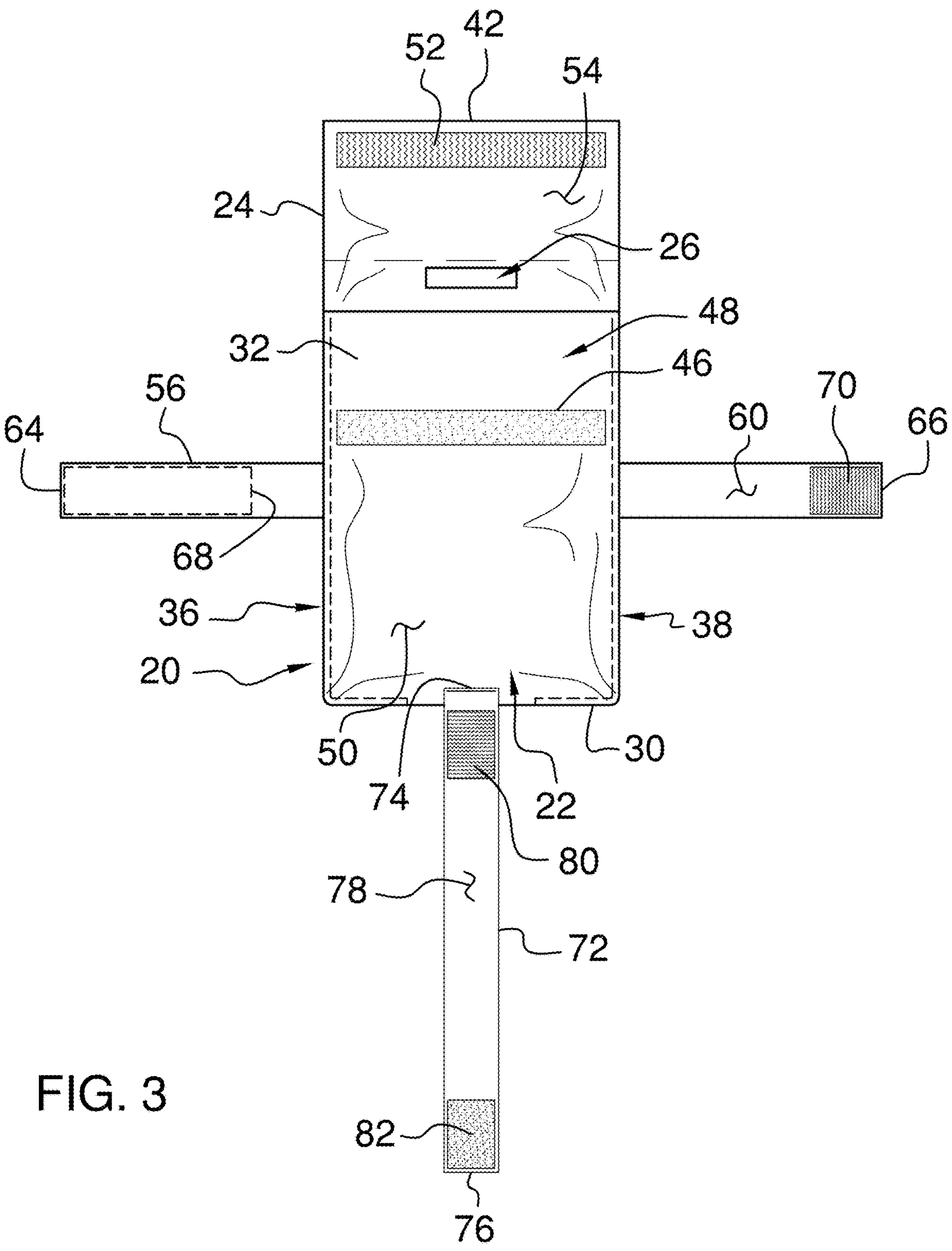
FIG. 3 is a front view of a bag of an embodiment of the disclosure.
Figure 4:
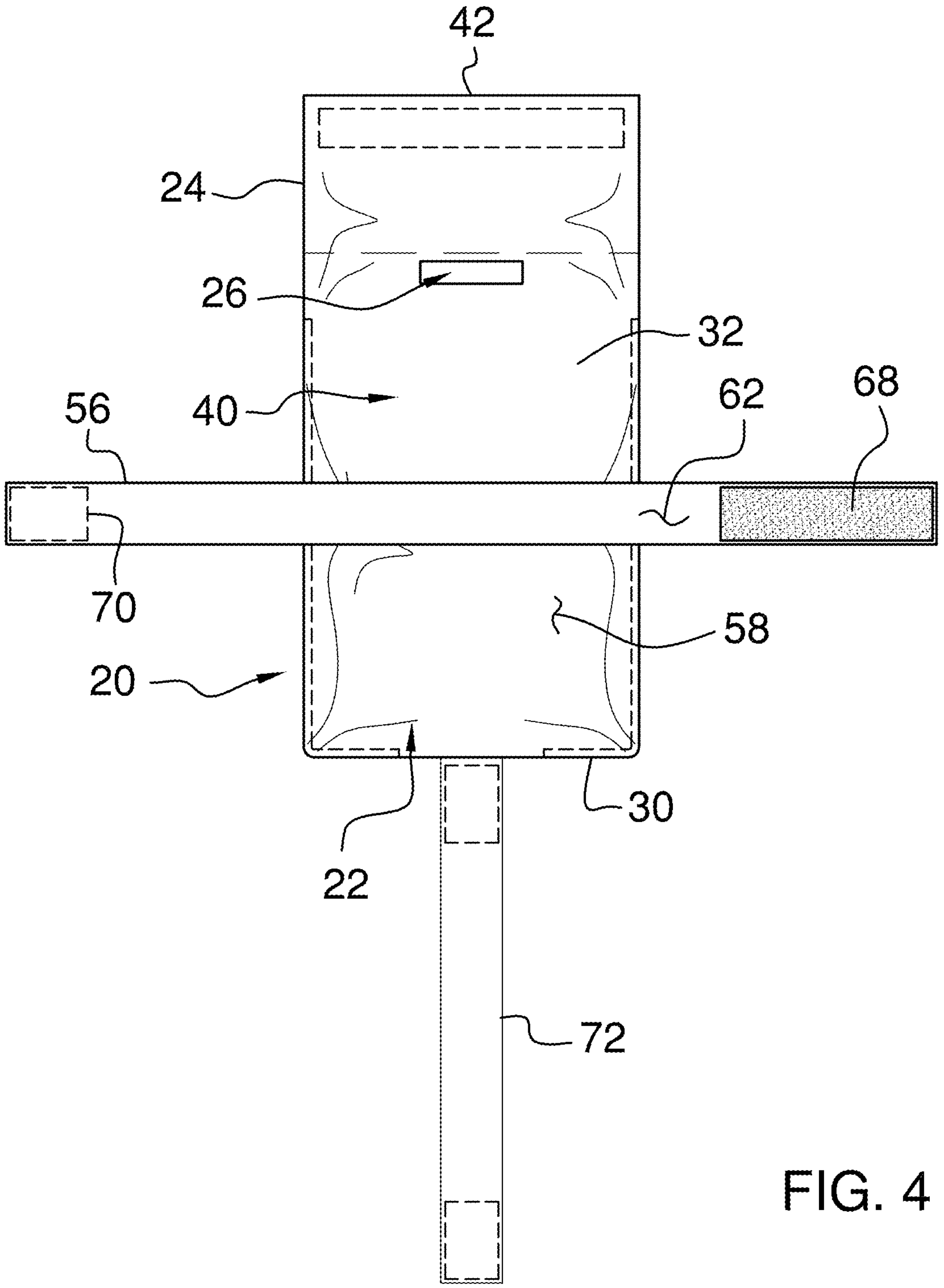
FIG. 4 is a back view of a bag of an embodiment of the disclosure.
Figure 5:
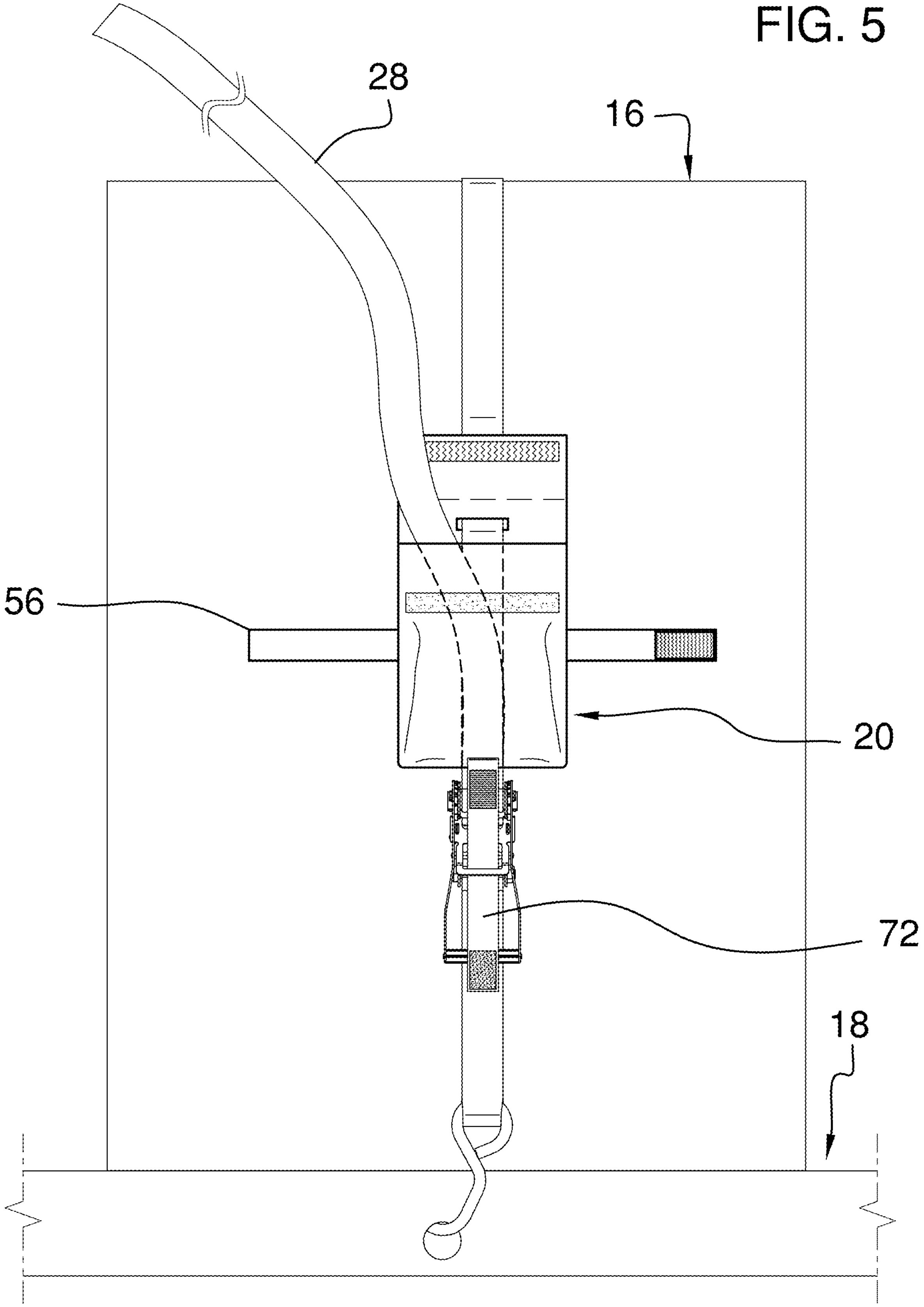
FIG. 5 is a perspective in-use view of an embodiment of the disclosure showing excess strap of a ratchet strap extending outwardly from a bag.
Figure 6:
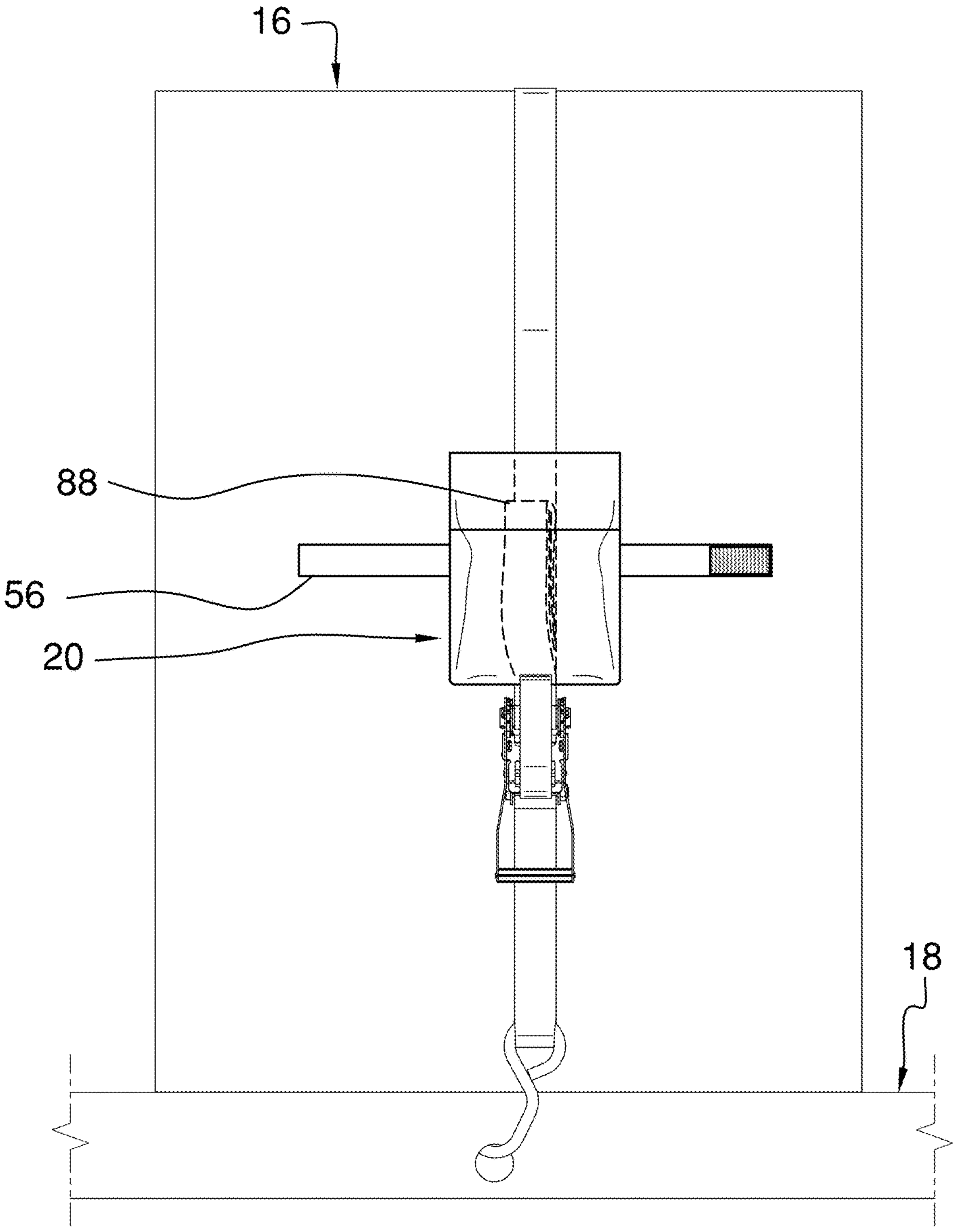
FIG. 6 is a perspective in-use view of an embodiment of the disclosure showing excess strap of a ratchet strap being stored in a bag.
Figure 7:
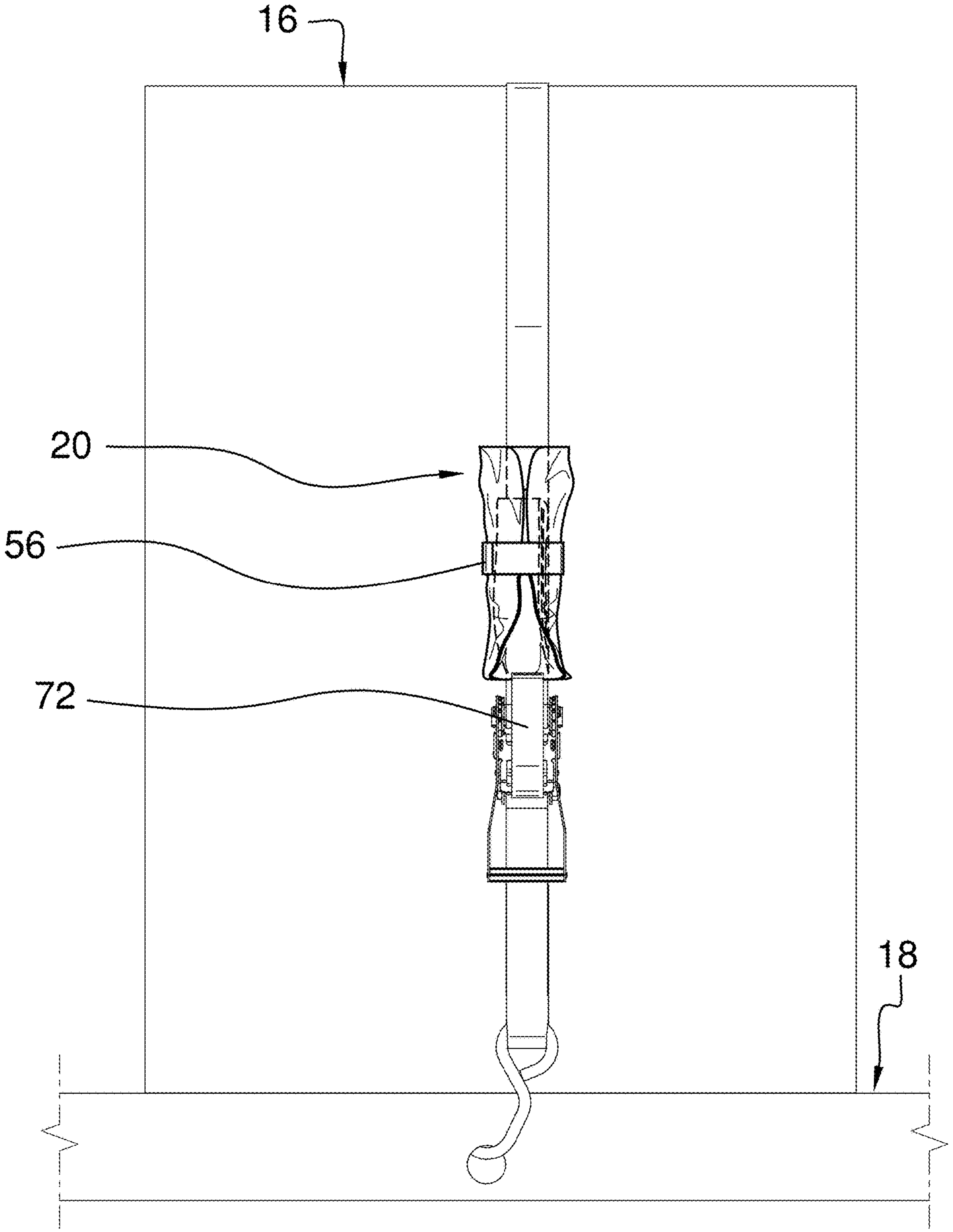
FIG. 7 is a perspective in-use view of an embodiment of the disclosure showing a first strap being wrapped around a bag.
Figure 8:
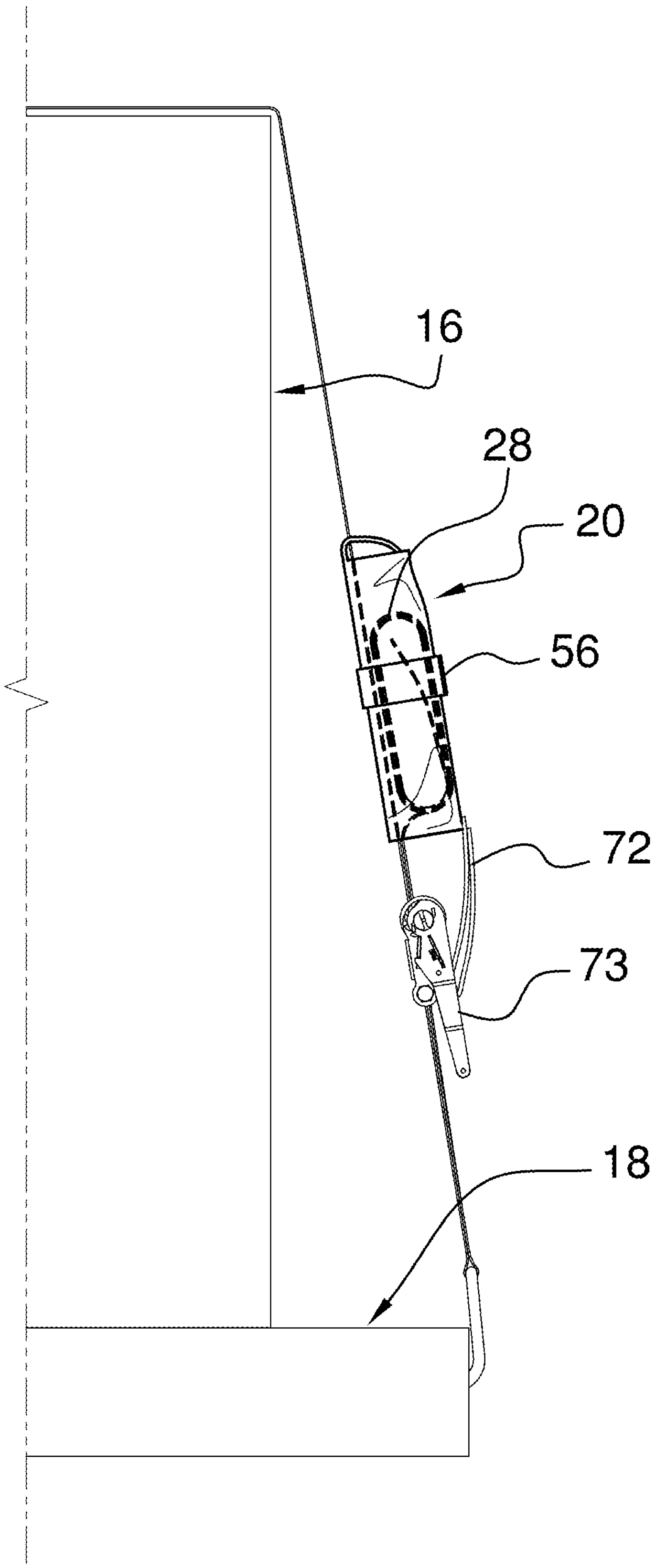
FIG. 8 is a left side phantom in-use view of an embodiment of the disclosure.

With reference now to the drawings, and in particular to FIGS. 1 through 10 thereof, a new ratchet strap device embodying the principles and concepts of an embodiment of the disclosure and generally designated by the reference numeral 10 will be described.

As best illustrated in FIGS. 1 through 10, the ratchet strap storage device 10 generally comprises a ratchet 12 and a ratchet strap 14 which extends through the ratchet 12; the ratchet strap 14 can be tightened over cargo 16 to secure the cargo 16 to a vehicle 18. Additionally, the ratchet 12 may be a mechanical ratchet of any conventional design commonly associated with cargo straps and the ratchet strap 14 may be a ratchet strap of any conventional design commonly associated with cargo straps. A bag 20 is provided which has a first slot 22 extending into an interior of the bag 20 and the ratchet strap 14 is insertable through the first slot 22. Additionally, the bag 20 has a flap 24 which is positionable in a closed position to close the bag 20. The flap 24 has a second slot 26 extending through the flap 24 and the ratchet strap 14 is extendable through the second slot 26 such that the ratchet strap 14 does not interfere with positioning the flap 24 in the closed position. Furthermore, excess length 28 of the ratchet strap 14 is wrapped up and is stored within the bag 20 and the flap 24 is positioned in the closed position when the ratchet strap 14 has been tightened over the cargo 16. The bag 20 and the flap 24 inhibit the excess length 28 of the ratchet strap 14 from flapping in the wind while the vehicle 18 is transporting the cargo 16.

The bag 20 has a bottom wall 30 and an exterior wall 32 extending upwardly from the bottom wall 30 and the first slot 22 extends through the bottom wall 30; the first slot 22 is centrally located on the bottom wall 30. The exterior wall 32 has a first lateral side 36 and a second lateral side 38; the first slot 22 is elongated along a line extending between the first lateral side 36 and the second lateral side 38 such that the first slot 22 accommodates a full width of the ratchet strap 14. The exterior wall 32 has a back side 40 and the flap 24 extends upwardly from the back side 40. Additionally, the flap 24 has a distal edge 42 with respect to the back side 40. The second slot 26 extends through the flap 24 and the second slot 26 is positioned closer to the back side 40 of the exterior wall 32 than the distal edge 42 of the flap 24. Furthermore, the second slot 26 is elongated along the line extending between the first lateral side 36 and the second lateral side 38 of the exterior wall 32 such that the second slot 26 accommodates the full width of the ratchet strap 14. The bag 20 may be comprised of a weather resistant material, including but not being limited to canvas or polyvinylchloride, such that the bag 20 resists being degraded by exposure to the outdoor environment.

A bag mating member 46 is provided and the bag mating member 46 is coupled to the bag 20. The exterior wall 32 of the bag 20 has a front side 48 and the front side 48 has an outer surface 50. Additionally, the bag mating member 46 is positioned on the outer surface 50 of the front side 48. The bag mating member 46 is elongated between the first lateral side 36 and the second lateral side 38 of the exterior wall 32 of the bag 20.

A flap mating member 52 is provided and the flap mating member 52 is coupled to the flap 24. The flap mating member 52 is releasably matable to the bag mating member 46 when the flap 24 is on the closed position to retain the flap 24 in the closed position. Furthermore, the flap 24 resists being opened by wind when the vehicle 18 is transporting the cargo 16. The flap 24 has a lower surface 54 and the flap mating member 52 is positioned on the lower surface 54. The flap mating member 52 is positioned adjacent to the distal edge 42 of the flap 24 and the flap mating member 52 is elongated along the distal edge 42. Additionally, each of the bag mating member 46 and the flap mating member 52 may comprise complementary portions of a hook and loop fastener or other type of multiple use, releasable fasteners.

A first strap 56 is coupled to the bag 20 and the first strap 56 is matable to itself such that the first strap 56 forms a closed loop. Furthermore, the first strap 56 can be wrapped around the bag 20 when the excess length 28 of the ratchet strap 14 is stored in the bag 20 for compressing the bag 20 around the excess length 28 of the ratchet strap 14. The first strap 56 inhibits the wind from dislodging the bag 20 from the ratchet strap 14 when the vehicle 18 is transporting the cargo 16. The back side 40 of the exterior wall 32 of the bag 20 has a rear surface 58; the first strap 56 has a front surface 60 and a back surface 62 and the first strap 56 has a first end 64 and a second end 66. The first strap 56 is elongated between the first end 64 and the second end 66 and the front surface 60 of the first strap 56 is coupled to the rear surface 58 of the back side 40 of the exterior wall 32 of the bag 20. Furthermore, the first strap 56 extends outwardly beyond each of the first lateral side 36 and the second lateral side 38 of the exterior wall 32 of the bag 20.

A first mating member 68 is coupled to the back surface 62 of the first strap 56. Additionally, the first mating member 68 is positioned adjacent to the first end 64 of the first strap 56. A second mating member 70 is coupled to the front surface 60 of the first strap 56. Additionally, the second mating member 70 is positioned adjacent to the second end 66 of the first strap 56. The second mating member 70 is releasably matable to the first mating member 68 for retaining the first strap 56 in the closed loop around the bag 20. In addition, each of the first mating member 68 and the second mating member 70 may comprise complementary portions of a hook and loop fastener or other type of multiple use, releasable fasteners.

A second strap 72 is coupled to the bag 20 and the second strap 72 is insertable through a handle 73 of the ratchet 12. The second strap 72 is releasably matable to itself such that the second strap 72 forms a closed loop. Furthermore, the second strap 72 inhibits the wind from dislodging the bag 20 from the ratchet 12 when the vehicle 18 is transporting the cargo 16. The second strap 72 has a coupled end 74 and a free end 76 and a forward surface 78 extending between the coupled end 74 and the free end 76. The coupled end 74 is coupled to the outer surface 50 of the front side 48 of the exterior wall 32 of the bag 20. Furthermore, the coupled end 74 is positioned adjacent to the bottom wall 30 of the bag 20 and the second strap 72 is centrally located between the first lateral side 36 and the second lateral side 38 of the exterior wall 32.

A primary mating member 80 is coupled to the forward surface 78 of the second strap 72. The primary mating member 80 is positioned adjacent to the coupled end 74 of the second strap 72. A secondary mating member 82 is coupled to the forward surface 78 of the second strap 72. The secondary mating member 82 is positioned adjacent to the free end 76 of the second strap 72. Additionally, the secondary mating member 82 is releasably matable to the primary mating member 80 for securing the second strap 72 around the handle 73 of the ratchet 12. Each of the primary mating member 80 and the secondary mating member 82 may comprise complementary portions of a hook and loop fastener or other type of multiple use, releasable fasteners.

Figure 9:
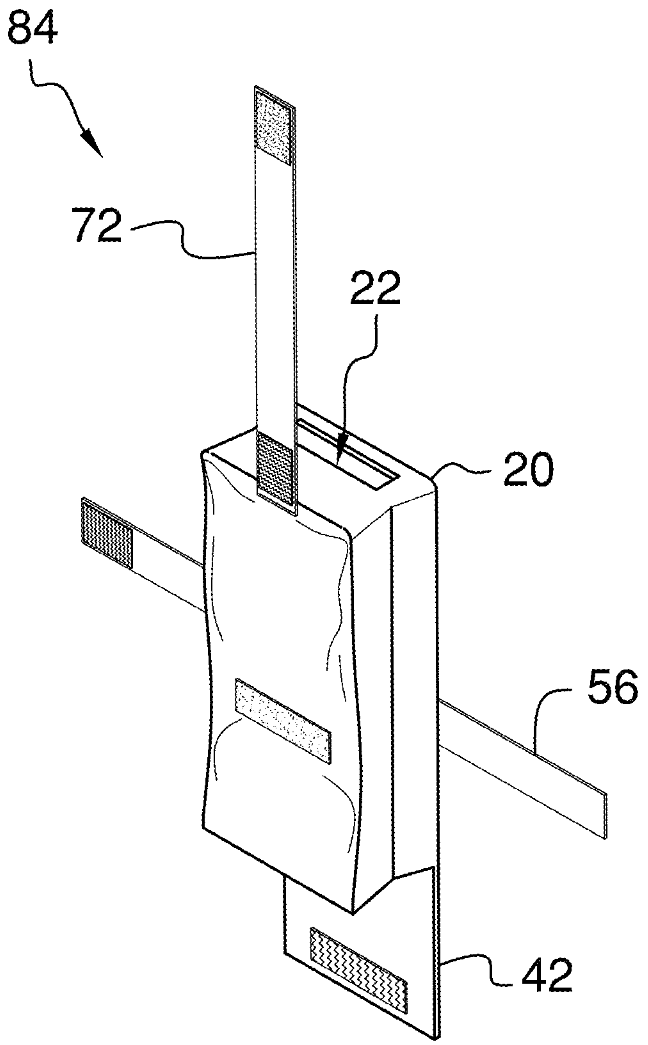
FIG. 9 is a perspective view of an alternative embodiment of the disclosure.
Figure 10:
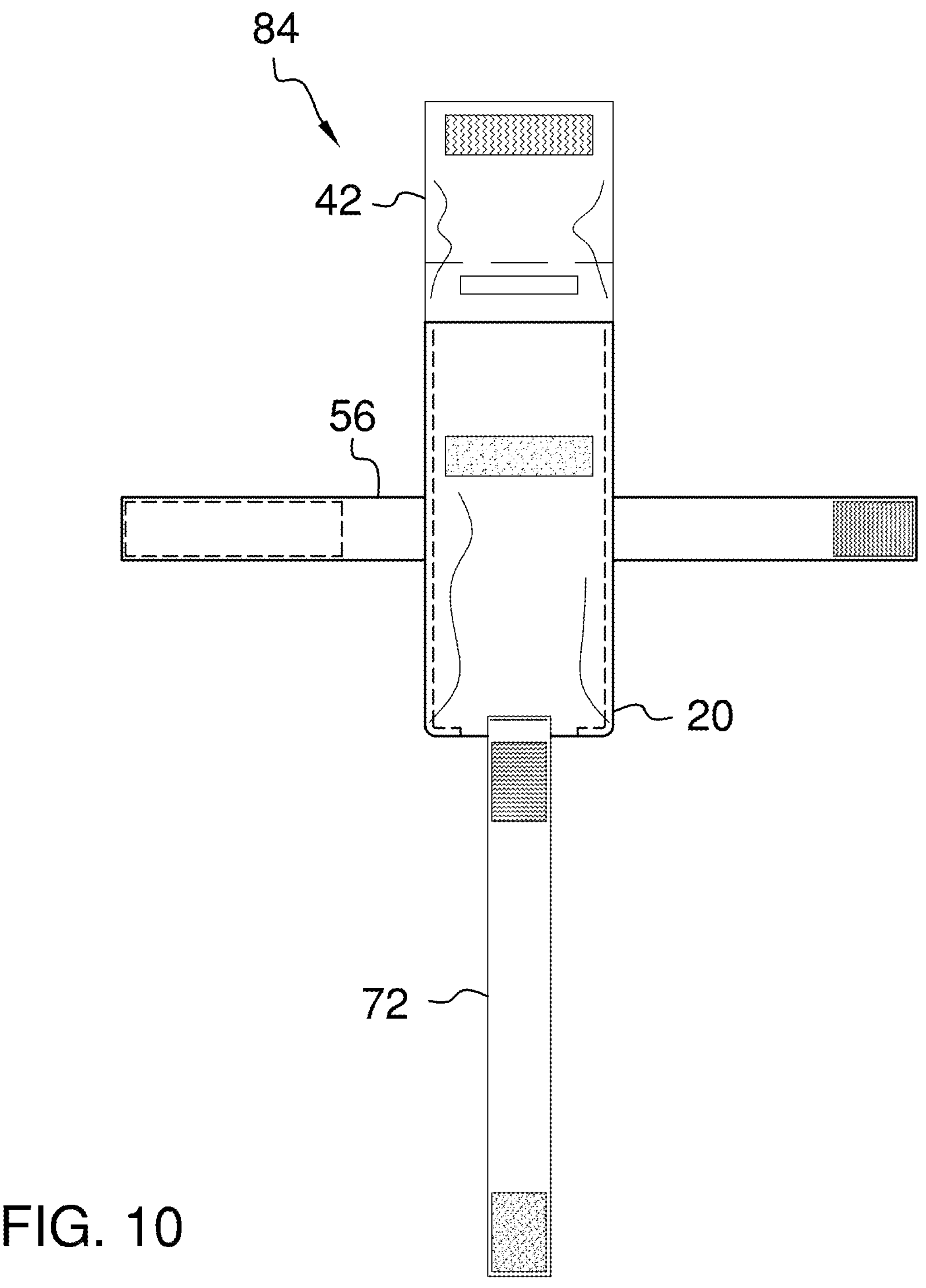
FIG. 10 is a front view of an alternative embodiment of the disclosure.

The bag 20 may have a height and a width ranging between approximately 20.0 cm and 30.0 cm such that the bag can store the excess length 28 of the ratchet strap 14 and the ratchet 12. In an alternative embodiment 84 as shown in FIGS. 9 and 10, the bag 20 may have a width ranging between approximately 10.0 cm and 15.0 cm and a height ranging between approximately 20.0 cm and 30.0 cm. Furthermore, the bag 20 in the alternative embodiment 84 can store the excess length 28 of the ratchet strap 14 but not the ratchet 12. In addition, the bag 20 in the alternative embodiment 84 remains on the ratchet strap 14 the entire time and the bag 20 in the alternative embodiment 84 may be permanently attached to the ratchet strap 14 with stitching or other means of attachment.

In use, the ratchet strap 14 is extended through the first slot 22 in the bag 20 and the second slot 26 in the bag 20 and the ratchet strap 14 is tightened over the cargo 16 to secure the cargo 16 on the vehicle 18. The excess ratchet strap 14 is wrapped up and placed into the bag 20 and the flap 24 is moved into the closed position until the flap mating member 52 is mated to the bag mating member 46. The second strap 72 is threaded through the handle 73 of the ratchet 12 and the second strap 72 is subsequently mated to itself to secure the bag 20 to the ratchet 12. Additionally, the first strap 56 is wrapped around the bag 20 to secure the bag 20 around the ratchet strap 14. The first strap 56 and the second strap 72 restrict movement of the bag 20 on the ratchet strap 14. Furthermore, the bag 20 inhibits the excess length 28 of the ratchet strap 14 from flapping in the wind when the vehicle 18 is transporting the cargo 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ratchet strap storage device, comprising:

a ratchet;

a ratchet strap extending through said ratchet wherein said ratchet strap is configured to be tightened over the cargo to secure the cargo to a vehicle;

a bag having a first slot extending into an interior of said bag, said ratchet strap being insertable through said first slot, said bag having a flap being positionable in a closed position to close said bag, said flap having a second slot extending through said flap, said ratchet strap being extendable through said second slot such that said ratchet strap does not interfere with positioning said flap in said closed position, said excess length of said ratchet strap being stored within said bag having said flap being positioned in said closed position wherein said excess length of said ratchet strap is configured to be protected from flapping in the wind while the vehicle is transporting the cargo;

a bag mating member being coupled to said bag;

a flap mating member being coupled to said flap, said flap mating member being releasably matable to said bag mating member when said flap is on said closed position to retain said flap in said closed position wherein said flap is configured to resist being opened by wind when the vehicle is transporting the cargo;

a first strap being coupled to said bag, said first strap being matable to itself such that said first strap forms a closed loop, said first strap being wrappable around said bag when said excess length of said ratchet strap is stored in said bag for compressing said bag around said excess length of said ratchet strap wherein said first strap is configured to inhibit the wind from dislodging said bag from said ratchet strap when the vehicle is transporting the cargo; and a second strap being coupled to said bag, said second strap being insertable through said ratchet, said second strap being releasably matable to itself such that said second strap forms a closed loop wherein said second strap is configured to inhibit the wind from dislodging said bag from said ratchet when the vehicle is transporting the cargo.

2. The device according to claim 1, further comprising:

said bag having a bottom wall and an exterior wall extending upwardly from said bottom wall;

said first slot extending through said bottom wall;

said first slot being centrally located on said bottom wall;

said exterior wall having a first lateral side and a second lateral side; and said first slot being elongated along a line extending between said first lateral side and said second lateral side such that said first slot accommodates a full width of said ratchet strap.

3. The device according to claim 2, further comprising:

said exterior wall having a back side;

said flap extending upwardly from said back side;

said flap having a distal edge with respect to said back side;

said second slot extending through said flap;

said second slot being positioned closer to said back side of said exterior wall than said distal edge of said flap; and said second slot being elongated along said line extending between said first lateral side and said second lateral side of said exterior wall such that said second slot accommodates said full width of said ratchet strap.

4. The device according to claim 2, further comprising:

said exterior wall of said bag having a front side;

said front side having an outer surface;

said bag mating member being positioned on said outer surface of said front side; and said bag mating member being elongated between said first lateral side and said second lateral side of said exterior wall of said bag.

5. The device according to claim 2, further comprising:

said back side of said exterior wall of said bag having a rear surface;

said first strap having a front surface and a back surface;

said first strap having a first end and a second end;

said first strap being elongated between said first end and said second end;

said front surface of said first strap being coupled to said rear surface of said back side of said exterior wall of said bag; and said first strap extending outwardly beyond each of said first lateral side and said second lateral side of said exterior wall of said bag.

6. The device according to claim 5, further comprising:

a first mating member being coupled to said back surface of said first strap; and said first mating member being positioned adjacent to said first end of said first strap.

7. The device according to claim 6, further comprising:

a second mating member being coupled to said front surface of said first strap;

said second mating member being positioned adjacent to said second end of said first strap; and said second mating member being releasably matable to said first mating member for retaining said first strap in said closed loop around said bag.

8. The device according to claim 2, further comprising:

said second strap having a coupled end and a free end and a forward surface extending between said coupled end and said free end;

said coupled end being coupled to said outer surface of said front side of said exterior wall of said bag;

said coupled end being positioned adjacent to said bottom wall of said bag; and said second strap being centrally located between said first lateral side and said second lateral side of said exterior wall.

9. The device according to claim 8, further comprising:

a primary mating member being coupled to said forward surface of said second strap; and said primary mating member being positioned adjacent to said coupled end of said second strap.

10. The device according to claim 9, further comprising:

a secondary mating member being coupled to said forward surface of said second strap;

said secondary mating member being positioned adjacent to said free end of said second strap; and said secondary mating member being releasably matable to said primary mating member for securing said second strap around said ratchet.

11. The device according to claim 1, further comprising:

said flap having a lower surface and a distal edge;

said flap mating member being positioned on said lower surface;

said flap mating member being positioned adjacent to said distal edge of said flap; and said flap mating member being elongated along said distal edge.

12. A ratchet strap storage device, comprising:

a ratchet;

a ratchet strap extending through said ratchet wherein said ratchet strap is configured to be tightened over the cargo to secure the cargo to a vehicle;

a bag having a first slot extending into an interior of said bag, said ratchet strap being insertable through said first slot, said bag having a flap being positionable in a closed position to close said bag, said flap having a second slot extending through said flap, said ratchet strap being extendable through said second slot such that said ratchet strap does not interfere with positioning said flap in said closed position, said excess length of said ratchet strap being stored within said bag having said flap being positioned in said closed position wherein said excess length of said ratchet strap is configured to be protected from flapping while the vehicle is transporting the cargo, said bag having a bottom wall and an exterior wall extending upwardly from said bottom wall, bag having a first slot extending through said bottom wall, said first slot being centrally located on said bottom wall, said first slot defining said first slot of said bag, said exterior wall having a first lateral side and a second lateral side, said first slot being elongated along a line extending between said first lateral side and said second lateral side such that said first slot accommodates a full width of said ratchet strap, said exterior wall having a back side, said flap extending upwardly from said back side, said flap having a distal edge with respect to said back side, said flap having a second slot extending through said flap, said second slot being positioned closer to said back side of said exterior wall than said distal edge of said flap, said second slot defining said second slot, said second slot being elongated along said line extending between said first lateral side and said second lateral side of said exterior wall such that said second slot accommodates said full width of said ratchet strap;

a bag mating member being coupled to said bag, said exterior wall of said bag having a front side, said front side having an outer surface, said bag mating member being positioned on said outer surface of said front side, said bag mating member being elongated between said first lateral side and said second lateral side of said exterior wall of said bag;

a flap mating member being coupled to said flap, said flap mating member being releasably matable to said bag mating member when said flap is on said closed position to retain said flap in said closed position wherein said flap is configured to resist being opened by wind when the vehicle is transporting the cargo, said flap having a lower surface, said flap mating member being positioned on said lower surface, said flap mating member being positioned adjacent to said distal edge of said flap, said flap mating member being elongated along said distal edge;

a first strap being coupled to said bag, said first strap being matable to itself such that said first strap forms a closed loop, said first strap being wrappable around said bag when said excess length of said ratchet strap is stored in said bag for compressing said bag around said excess length of said ratchet strap wherein said first strap is configured to inhibit the wind from dislodging said bag from said ratchet strap when the vehicle is transporting the cargo, said back side of said exterior wall of said bag having a rear surface, said first strap having a front surface and a back surface, said first strap having a first end and a second end, said first strap being elongated between said first end and said second end, said front surface of said first strap being coupled to said rear surface of said back side of said exterior wall of said bag, said first strap extending outwardly beyond each of said first lateral side and said second lateral side of said exterior wall of said bag;

a first mating member being coupled to said back surface of said first strap, said first mating member being positioned adjacent to said first end of said first strap;

a second mating member being coupled to said front surface of said first strap, said second mating member being positioned adjacent to said second end of said first strap, said second mating member being releasably matable to said first mating member for retaining said first strap in said closed loop around said bag;

a second strap being coupled to said bag, said second strap being insertable through said ratchet, said second strap being releasably matable to itself such that said second strap forms a closed loop wherein said second strap is configured to inhibit the wind from dislodging said bag from said ratchet when the vehicle is transporting the cargo, said second strap having a coupled end and a free end and a forward surface extending between said coupled end and said free end, said coupled end being coupled to said outer surface of said front side of said exterior wall of said bag, said coupled end being positioned adjacent to said bottom wall of said bag, said second strap being centrally located between said first lateral side and said second lateral side of said exterior wall;

a primary mating member being coupled to said forward surface of said second strap, said primary mating member being positioned adjacent to said coupled end of said second strap; and a secondary mating member being coupled to said forward surface of said second strap, said secondary mating member being positioned adjacent to said free end of said second strap, said secondary mating member being releasably matable to said primary mating member for securing said second strap around said ratchet.

* * * * *